US010558548B2

(12) United States Patent
Lobato et al.

(10) Patent No.: US 10,558,548 B2
(45) Date of Patent: Feb. 11, 2020

(54) REPLICATING CONTOURS OF SOUNDSCAPES WITHIN COMPUTING ENCLOSURES

(71) Applicant: HEWLETT PACKARD ENTERPRISE DEVELOPMENT LP, Houston, TX (US)

(72) Inventors: William D. Lobato, Houston, TX (US); Punan Tang, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 220 days.

(21) Appl. No.: 15/582,043

(22) Filed: Apr. 28, 2017

(65) Prior Publication Data

US 2018/0314618 A1    Nov. 1, 2018

(51) Int. Cl.
*G06F 11/34* (2006.01)
*G06M 7/02* (2006.01)
*G01M 7/02* (2006.01)

(52) U.S. Cl.
CPC ......... *G06F 11/3457* (2013.01); *G01M 7/022* (2013.01)

(58) Field of Classification Search
CPC .................. G06F 11/3457; G01M 7/022
See application file for complete search history.

(56) References Cited

U.S. PATENT DOCUMENTS

| 7,142,419 | B2 | 11/2006 | Cochrane | |
|---|---|---|---|---|
| 7,587,057 | B2 | 9/2009 | Baugh et al. | |
| 8,300,840 | B1* | 10/2012 | Frye | H04R 29/00 381/313 |
| 9,036,291 | B1 | 5/2015 | Nava et al. | |
| 2004/0170282 | A1 | 9/2004 | Tahara et al. | |
| 2006/0072228 | A1 | 4/2006 | Geerlings et al. | |
| 2009/0092261 | A1* | 4/2009 | Bard | G06F 1/206 381/71.1 |
| 2011/0216926 | A1* | 9/2011 | Riggs | H04R 5/02 381/300 |
| 2012/0150469 | A1* | 6/2012 | Welter | F04D 27/001 702/77 |
| 2012/0288107 | A1* | 11/2012 | Lamm | H04R 25/30 381/59 |

(Continued)

OTHER PUBLICATIONS

Arunima Panigrahy et al., "Acoustics Management for Server Debug Validation Platforms," 25th IEEE Semi-Therm Symposium, 2009, pp. 216-221, IEEE.

*Primary Examiner* — Mohammad K Islam
(74) *Attorney, Agent, or Firm* — Hewlett Packard Enterprise Patent Department

(57) ABSTRACT

Example implementations relate to generating a performance index of an electrical device. An example implementation includes determining an acoustical contour of a soundscape within a computing enclosure for housing the electrical device. A performance response of the electrical device when subjected to the soundscape within the computing enclosure may be determined. Specifically, a soundscape may be generated within a test chamber that replicates the acoustical contour of the soundscape within the computing enclosure. A performance index of the electrical device may be generated upon being subjected to the generated soundscape.

20 Claims, 4 Drawing Sheets

(56) References Cited

U.S. PATENT DOCUMENTS

| | | | |
|---|---|---|---|
| 2014/0295771 A1* | 10/2014 | Finlow-Bates | H04W 24/06 455/67.14 |
| 2014/0341419 A1* | 11/2014 | Risberg | H04R 1/345 381/386 |
| 2015/0030165 A1* | 1/2015 | Risberg | H04R 29/001 381/58 |
| 2015/0304772 A1* | 10/2015 | Risberg | H04R 3/007 381/55 |
| 2016/0071526 A1* | 3/2016 | Wingate | G10L 21/028 704/233 |
| 2017/0199162 A1* | 7/2017 | Nordstrom | G01N 29/30 |
| 2018/0124514 A1* | 5/2018 | Peeler | H04R 3/04 |

* cited by examiner

REPLICATING CONTOURS OF SOUNDSCAPES WITHIN COMPUTING ENCLOSURES

BACKGROUND

Modern computational systems, such as servers, function through the use of electricity. As electricity passes through circuits, a natural degree of resistance is met. This friction may produce considerable heat, and the more electricity that passes through the system, the more heat that is generated.

When a system overheats, it may lead to system component failures. To minimize component failures, any number of components, such as heat sinks and/or fans, may be included in the system to disperse or dissipate heat generated by the system.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
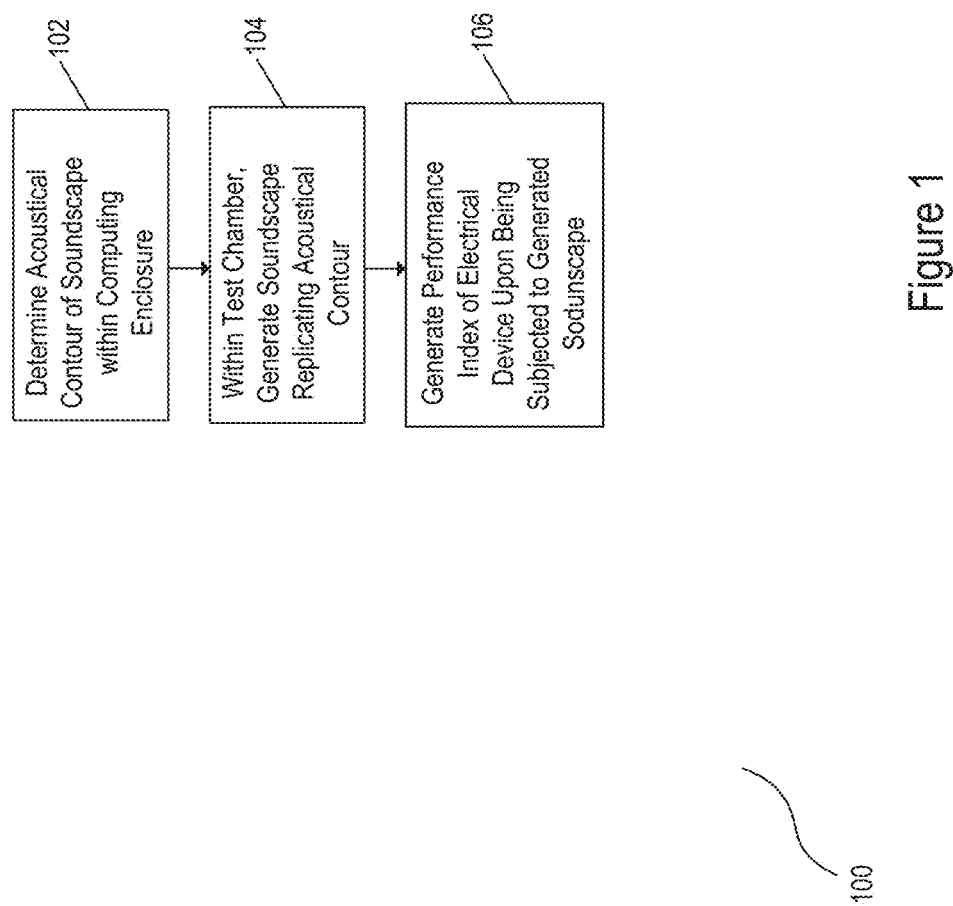
FIG. 1 is a flowchart illustrating an example method for generating a performance index of an electrical device.

An electrical device, such as a disk drive, may become damaged or may experience a decrease in performance where the electrical device is exposed to sound waves. Specifically, the electrical device may be susceptible to a sound wave generated at a particular frequency. For instance, where a particular frequency is a resonance frequency of a material component of the electrical device, the electrical device may experience undue vibration which may damage or cause decreased performance of the device.

Additionally, an electrical device may be damaged by sound pressure caused by sound waves. Sound pressure, the force applied to a surface due to the pressure generated by a sound wave, directly correlates with the frequency of a sound wave, i.e, the pitch of a sound wave, and the amplitude of a sound wave, i.e., the volume of a sound wave. Thus, high frequency sound waves, or sound waves having large amplitudes, may generate significant sound pressure and may in turn cause undue stress to an electrical device exposed to that sound pressure. At a threshold level of sound pressure, an electrical device may become damaged or experience a decrease in performance.

An electrical device may therefore be acoustically sensitive, i.e., susceptible to damage or decreased performance, to a sound wave having a particular contour. The contour of a sound wave, such as the waveform of the sound wave, is the particular sinusoidal pattern of the sound wave, which inherently has a specified frequency and amplitude. An electrical device may therefore be acoustically sensitive to a contour having a particular frequency, particular amplitude, or any combination thereof.

The particular amplitudes and frequencies of sound waves to which an electrical device is exposed may be dependent on the environment in which the electrical device is housed. For instance, sound waves may interfere with one another as well as the surfaces upon which they reflect such that a sound may have a different contour at a location away from a sound source than at the sound source itself. Sound waves as they exist in a particular environment may be known as a soundscape. Therefore, sound generated in a first environment may have a different soundscape than the same sound generated in a second environment.

Electrical devices, such as disk drives, may generate heat, and are therefore often proximally located to a cooling device when housed within a computing enclosure. Large server environments often generate considerable heat due to resistance applied to electrical current within the system, and large fans rotating at fast speeds may be utilized to effectively cool such environments. However, large fans rotating at fast speeds may generate large amounts of noise, which may generate sound waves of large amplitudes and varying high frequencies. As discussed above, these sound waves may have particular contours that may disrupt the performance of a disk drive.

The performance disruption caused by cooling devices may be avoided where the acoustic sensitivity of an electrical device is identified. Specifically, by generating a performance index of an electrical device, i.e., a classification of the particular acoustic sensitivities of an electrical device, the acoustic sensitivity of an electrical device may be accounted for within a computing enclosure. For example, an electrical device may be placed in the computing enclosure at a location relative to the cooling device in which exposure to sensitive contours generated by the cooling device are minimized. As another example, the computing enclosure may be acoustically treated, e.g. via a dampening mechanism or by changing the dimensions of the computing enclosure, to minimize the exposure of sensitive contours on the electrical device.

As yet another example, the electrical device itself may be acoustically treated to account for its own identified acoustic sensitivities, and/or the environment in which the electrical device will be housed. For example, a protective dampening layer may be added to the electrical device for absorbing sensitive contours, or the materials of the electrical device may be changed and/or treated to relieve the device of any of the identified acoustic sensitivities.

FIG. 1 is a flowchart illustrating an example method 100 for generating a performance index of an electrical device that identifies the acoustic sensitivities of the electrical device. Method 100 may be executed or performed, for example, by some or all of the system components described in system 300 below. Method 100 may be implemented in the form of executable instructions stored on at least one machine-readable storage medium of a system and executed by at least one processor of the system. Alternatively or in addition, method 100 may be implemented in the form of electronic circuitry (e.g. hardware). The sequence of operations described in connection with FIG. 1 is not intended to be limiting, and an implementation consistent with the example of FIG. 1 may be performed in a different order than the example illustrated. Additionally, operations may be added or removed from the method 100.

At block 102 of method 100, an acoustical contour of a soundscape within a computing enclosure is determined. In an example, the acoustical contour is a waveform the electrical device will be exposed to when housed in the computing enclosure. Any number of methods may be implemented to determine the acoustical contour of the soundscape within the computing enclosure. In one such example, a transducer, such as a microphone, may be placed at an electrical device housing location within the computing enclosure, or at an acoustically similar location within the computing enclosure. The transducer may receive and record the contour as generated by any cooling device local to the computing enclosure.

A performance response of the electrical device when subjected to the soundscape may be determined. At block 104, a soundscape replicating the acoustical contour of the soundscape within the computing enclosure may be generated within a test chamber. In an example, the test chamber may be different than the computing enclosure and may have similar or different physical dimensions than the computing enclosure. In an example, the test chamber may have substantially the same physical dimensions as the computing enclosure such that the soundscape generated in the test chamber would be substantially the same as the soundscape generated in the computing enclosure. The test chamber may be an enclosure, and may simulate an enclosure such as a server chassis for housing a disk drive. The test chamber may be designed for acoustically replicating the acoustical environment of a computing enclosure. Examples of generating the acoustical contour of the soundscape within the test chamber will be described within greater detail below.

At block 106, a performance index of an electrical device may be generated upon being subjected to the generated soundscape. For instance, the electrical device may be subjected to a contour of a soundscape within the test chamber that replicates the contour of the soundscape generated within a computing enclosure for housing the electrical device. A performance of the electrical device subjected to the replicated contour may be measured and indexed, such that the performance effect of the contour on the electrical device may be recorded.

The performance index may include a susceptible frequency range of the electrical device. For example, the performance index may include an internal resonance frequency of the electrical device, which may include a resonance frequency of a component and/or material of the electrical device. The performance index may also include a frequency threshold, a decibel level threshold, or a threshold combination of both frequency and decibel level to which the electrical device is acoustically susceptible due to undue strain on the electrical device. The performance index may further include frequencies at which the electrical device experiences a threshold degradation in performance. For example, the performance index may classify frequencies at which the electrical device experiences a 20% decrease in performance. The threshold may be classified by a decrease in performance relative to exposure of the electrical device to negligible sound, or the threshold may be classified by a decrease in performance relative to exposure of the electrical device to frequencies to which the electrical device is not susceptible.

Figure 2:
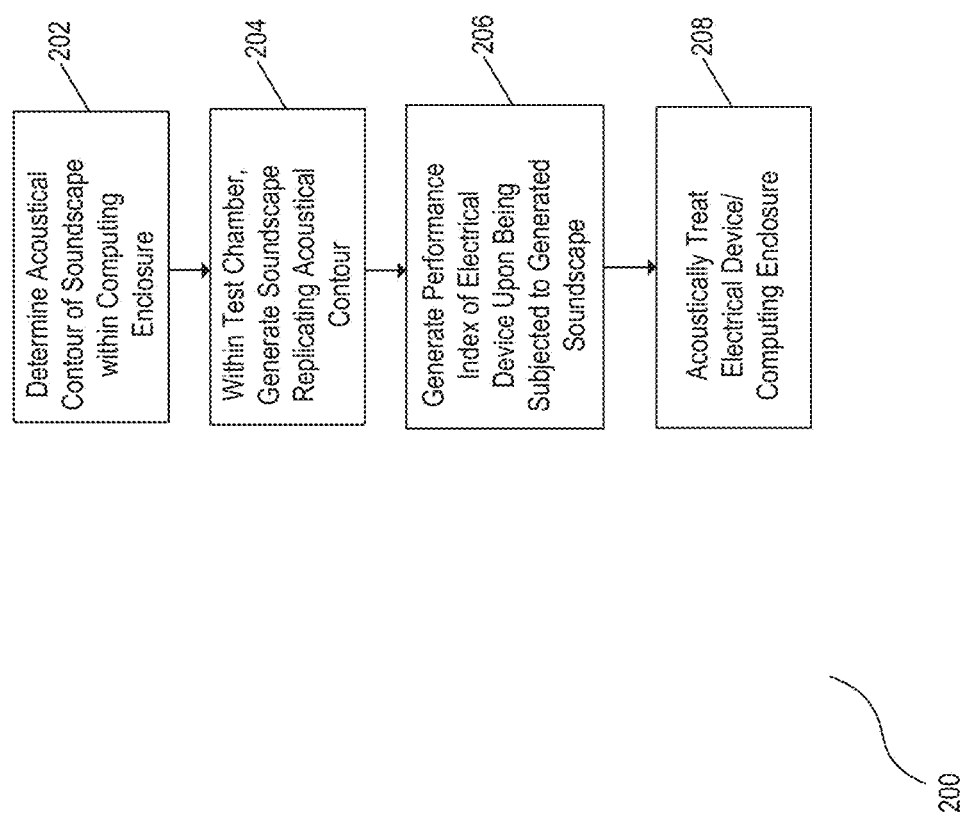
FIG. 2 is a flowchart illustrating an example method for acoustically treating an electrical device and/or computing enclosure.

Acoustical treatment may be performed to counteract the acoustic susceptibilities of an electrical device. FIG. 2 is a flowchart illustrating a method 200 for acoustically treating an electrical device and/or a computing enclosure in which the electrical device will be housed. Method 200 may be executed or performed, for example, by some or all of the system components described in system 300 below. Method 200 may be implemented in the form of executable instructions stored on at least one machine-readable storage medium of a system and executed by at least one processor of the system. Alternatively or in addition, method 200 may be implemented in the form of electronic circuitry (e.g. hardware). The sequence of operations described in connection with FIG. 2 is not intended to be limiting, and an implementation consistent with the example of FIG. 2 may be performed in a different order than the example illustrated. Additionally, operations may be added or removed from the method 200.

Blocks represented within FIG. 2 may be described with reference to example blocks of FIG. 1. Specifically, blocks 202-206 may be implemented as described in blocks 102-106 as mentioned above. At block 202, an acoustical contour of a soundscape within a computing enclosure may be determined. At block 204, a soundscape may be generated that replicates the acoustical contour of the soundscape within the computing enclosure, and at block 206, a performance index of an electrical device may be generated upon being subjected to the generated soundscape.

At block 208, acoustical treatment may be applied to the electrical device or to the computing enclosure in which the electrical device is housed. For example, the housing of the electrical device within the computing enclosure may be acoustically treated to prevent exposure of the electrical device to harmful frequencies or undue sound pressure. As an example, the performance index of the electrical device may be utilized for the acoustical treatment to account for any acoustic sensitivity of the electric device. For example, where the electrical device is acoustically sensitivity to soundwaves of a particular frequency, a sound absorbent material may be applied to the electrical device or within the computing enclosure that houses the electrical device to absorb the particular frequencies. As another example, the cooling devices within the computing enclosure may be adjusted to account for the performance index of the electrical device. For instance, the operating speeds of a fan within the computing enclosure may be increased or decreased such that the fan generates frequencies to which the disk drive may not be susceptible.

An example of acoustical treatment may also include repositioning an acoustically susceptible electrical device within a computing enclosure. The housing for the electrical device may also be relocated within the computing enclosure such that the exposure of the electrical device to harmful sound may be minimized. As another example, a cooling device within the computing disclosure generating sound to which the electrical device is particularly susceptible may be relocated within the computing enclosure, or replaced by a cooling device that generates sound outside the range of susceptible frequencies of the electrical device.

Figure 3:
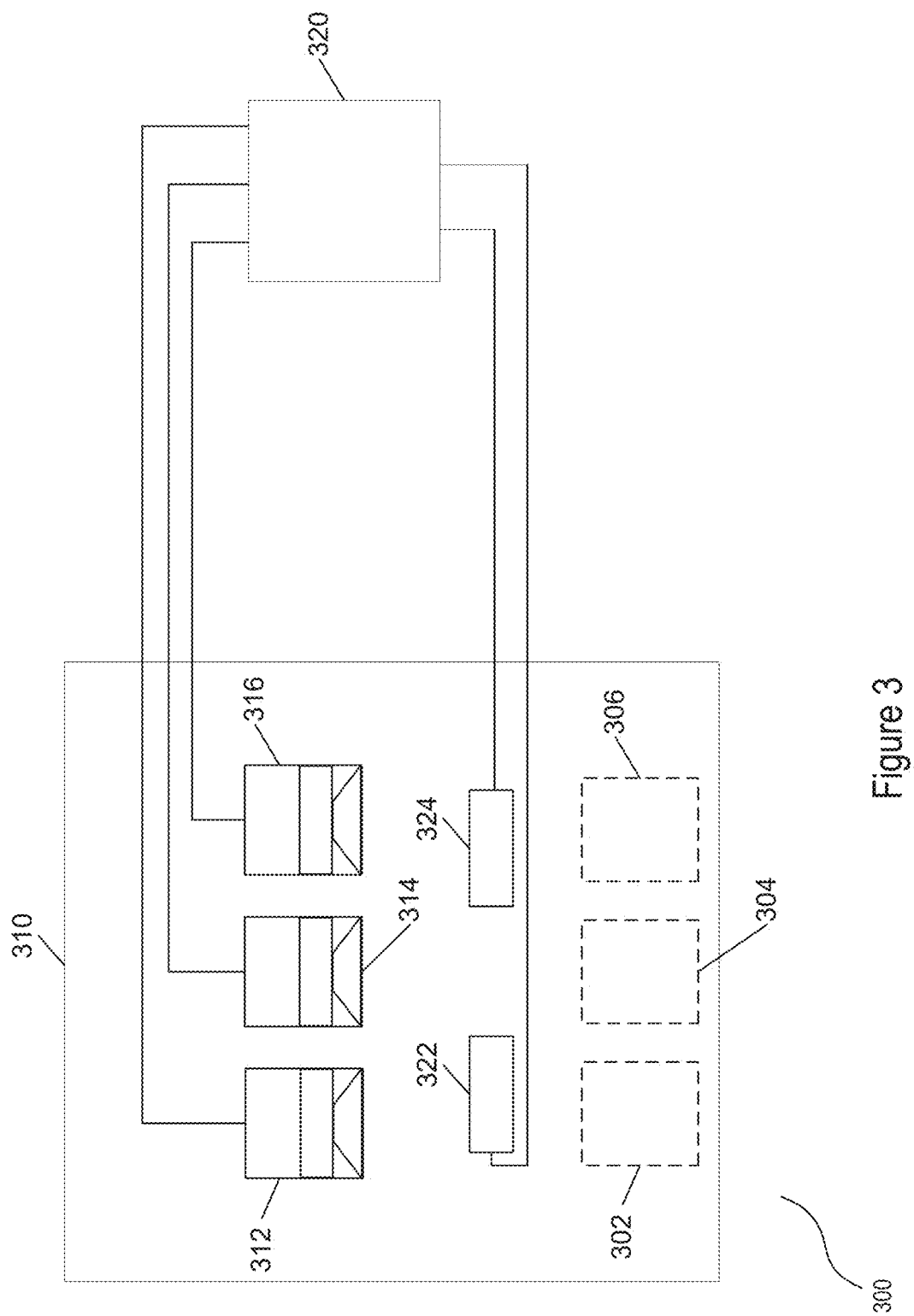
FIG. 3 is a block diagram illustrating an example system for determining an acoustical susceptibility of an electrical device.

As described above, an electrical device may be acoustically susceptible to acoustical contours the electrical device is expose to within a computing enclosure. FIG. 3 is a system 300 for determining the performance effect an acoustical contour will have on an electrical device within a computing enclosure. The system may include a test chamber 310 to simulate a computing enclosure for housing an electrical device. Any number of electrical devices may be tested at any number of locations within test chamber 310, and the location of where three such electrical devices, 302, 304, and 306, may be located are illustrated as examples. In an example, electrical devices 302-306 are placed within test chamber 310 at a location acoustically similar to a location at which electrical devices 302-306 may be housed within a computing enclosure, such as a server chassis.

System 300 may also include a feedback system for determining an acoustical susceptibility of an electrical device within test chamber 310. Within test chamber 310, the feedback system may replicate an acoustical contour of a soundscape within the computing enclosure such that the performance effect on electrical devices 302-306 when exposed to the acoustical contour may be determined.

The feedback system may include a sound generator for generating a test soundscape within test chamber 310. The sound generator may be an electroacoustic transducer for converting an electrical audio signal into sound, such as speakers 312, 314, and 316 illustrated in FIG. 3. In an example, speakers 312-316 may be positioned at a location relative to electrical devices 302-306 that mimics a location of a cooling device relative to the electrical devices within a server. For example, speaker 312 may be placed at a distance from electrical device 302 that is equivalent to the distance between a cooling device within the computing enclosure and an electrical device housed within the computing enclosure. Where the test chamber has substantially the same physical dimensions as a computing disclosure in which the electrical device is housed, the sound generator may be positioned at the same relative location within the test chamber as a cooling device within the computing disclosure. Therefore, the impact of sound generated by the cooling device on an electrical device within a computing enclosure may be accurately simulated within test chamber 310.

The feedback system may also include a transducer to receive an acoustical contour of the test soundscape generated by the sound generator. The transducer, such as microphones 322 and 324, may convert sound received by the transducer into an electrical audio signal. In an example, microphones 322 and 324 are positioned within test chamber 310 at an acoustically similar location to electrical devices 302-306 such that a contour of a soundscape received by microphone 322 or 324 substantially replicates a contour of the soundscape exposed to by electrical devices 302-306.

The feedback system may also include a soundscape modifier in communication with the transducer to modify the test soundscape generated by sound generators 312-316 within test chamber 310. For example, soundscape modifier 320 may modify the test soundscape such that an acoustical contour received by the transducer matches an acoustical contour of the soundscape within the computing enclosure. Soundscape modifier 320 may be implemented as hardware, software, or any combination thereof. In some examples soundscape modifier 320 may be an acoustic controller and may program a variety of potential sound fields, such as sound for a random wide band field, or a discrete narrow band field. Thus, the feedback system enables electrical devices 302-306 to be exposed to an acoustical contour that matches an acoustical contour electrical devices 302-306 would be exposed to within the computing enclosure.

The feedback system may also be programmed to test frequencies across a frequency spectrum, such that a performance index of an electrical device may be generated. For example, soundscape modifier 320 may gradually drive up the frequency generated by sound generators 312-316, and the performance of electrical devices 302-306 may be charted with the frequency increase. Similarly, soundscape modifier 320 may modify the decibel level of the sound generated by sound generators 312-316, and the performance of electrical devices 302-306 may be charted with the decibel level increase. Failure margins of electrical device components, or decreases in performance of the electrical components may be equated with specified frequency ranges, amplitude ranges, and/or any combination thereof.

Figure 4:
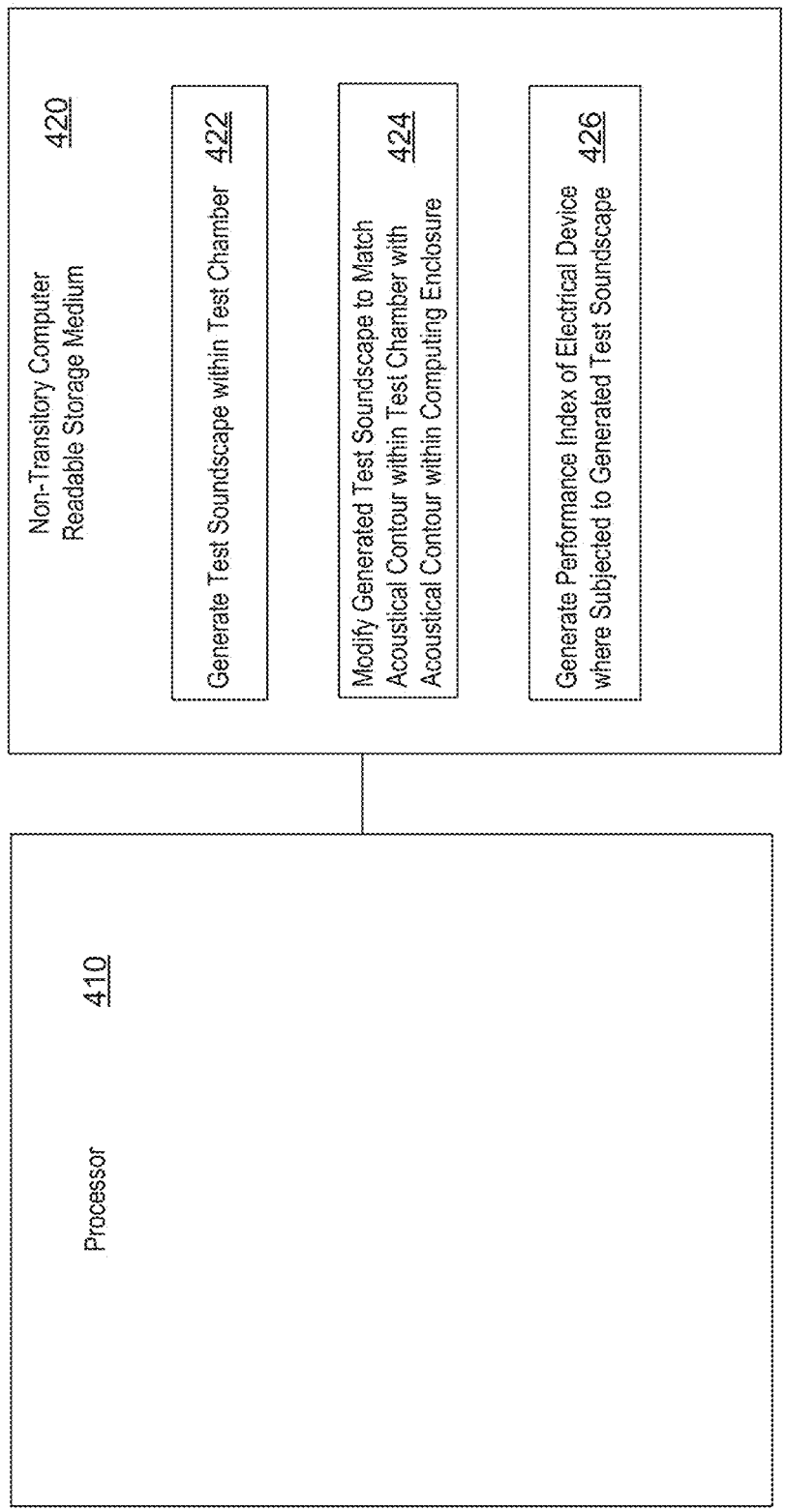
FIG. 4 is a block diagram illustrating an example non-transitory computer readable storage medium for generating a performance index of an electrical device.

FIG. 4 is a block diagram illustrating an example non-transitory computer readable storage medium 420 for reducing the rate limit of a rate limiter. Non-transitory computer readable storage medium 420 may be coupled to a processor, e.g. processor 410, and may include executable instructions thereon. Instructions 422, when executed, may cause processor 410 to generate a test soundscape within a test chamber. Instructions 424, when executed, may cause the generated test soundscape to be modified such that an acoustical contour of the test soundscape matches an acoustical contour of a soundscape within the computing enclosure. For example, instructions 424 may subject an electrical device to an acoustical contour within a test chamber that the electrical device would be exposed to within a computing enclosure.

Instructions 426 may be provided to generate a performance index of the electrical device upon being subjected to the generated test soundscape. In an example, the effect the matching acoustical contour has on the electrical device within the test chamber may be charted, and an acoustical susceptibility of the electrical device may be determined. Specifically, a performance of the electrical device subjected to the replicated contour may be measured and indexed, such that the performance effect of the contour on the electrical device may be recorded. In an example, the performance index includes the recorded performance effect of the contour on the electrical device.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method comprising:
    determining an acoustical contour of a soundscape within a computing enclosure for housing an electrical device, the determined acoustical contour based on a measurement by an acoustic transducer within the computing enclosure;
    placing the electrical device within a test chamber different from the computing enclosure;
    generating, by a sound generator within the test chamber, a soundscape replicating the determined acoustical contour of the soundscape within the computing enclosure; and
    generating a performance index of the electrical device based on detecting a threshold degradation in performance of the electrical device subjected to the generated soundscape within the test chamber.

2. The method of claim 1, wherein generating the performance index of the electrical device comprises identifying an acoustic sensitivity of the electrical device.

3. The method of claim 2, wherein the acoustic sensitivity includes an internal resonance frequency of the electrical device.

4. The method of claim 2, wherein the acoustic sensitivity includes a decibel level that causes the threshold degradation in performance of the electrical device due to sound pressure.

5. The method of claim 2, further comprising acoustically treating the electrical device to account for the acoustic sensitivity of the electrical device.

6. The method of claim 2, further comprising acoustically treating the computing enclosure to account for the acoustic sensitivity of the electrical device.

7. The method of claim 1, wherein generating the performance index of the electrical device includes identifying a susceptible frequency range of the electrical device, the susceptible frequency range causing the electrical device to experience the threshold degradation in performance of the electrical device.

8. The method of claim 1, wherein the test chamber simulates physical dimensions of the computing enclosure.

9. The method of claim 1, wherein the soundscape within the computing enclosure is replicated by:
   receiving, by a transducer in the test chamber, an acoustical contour of the soundscape within the test chamber; and
   modifying the soundscape within the test chamber such that the received acoustical contour matches the determined acoustical contour of the soundscape within the computing enclosure.

10. The method of claim 9, wherein the acoustical contour received by the transducer in the test chamber as modified by the modifying matches the determined acoustical contour to which the electrical device is subjected when housed in the computing enclosure.

11. The method of claim 1, wherein placing the electrical device within the test chamber comprises placing the electrical device at a location within the test chamber based on a location of the electrical device within the computing enclosure.

12. A system comprising:
   a test chamber to simulate a computing enclosure housing an electrical device; and
   a feedback system to, within the test chamber, replicate an acoustical contour of a soundscape within the computing enclosure housing the electrical device for determining an acoustical susceptibility of the electrical device, the feedback system comprising:
      a sound generator to generate a test soundscape within the test chamber;
      a transducer to receive an acoustical contour of the test soundscape; and
      a soundscape modifier comprising a processor and in communication with the transducer to:
         receive a representation of the acoustical contour of the soundscape within the computing enclosure housing the electrical device, and
         modify the test soundscape such that the acoustical contour of the test soundscape received at the transducer matches the acoustical contour of the soundscape within the computing enclosure as represented by the received representation.

13. The system of claim 12, wherein the sound generator is an electroacoustic transducer for converting an electrical audio signal into sound.

14. The system of claim 12, wherein:
   the electrical device is housed within the test chamber; and
   the sound generator is positioned at a location relative to the electrical device within the test chamber based on a location of a cooling device relative to the electrical device within the computing enclosure.

15. The system of claim 12, wherein the representation of the acoustical contour of the soundscape within the computing enclosure housing the electrical device is based on a measurement by a transducer of sound produced by a sound source within the computing enclosure housing the electrical device.

16. A non-transitory computer readable medium comprising instructions that when executed cause a system to:
   determine an acoustical contour of a soundscape within a computing enclosure housing an electrical device;
   generate a test soundscape within a test chamber separate from the computing enclosure;
   modify the generated test soundscape such that an acoustical contour of the test soundscape matches the determined acoustical contour of the soundscape within the computing enclosure;
   measure a performance of the electrical device subjected to the generated test soundscape within the test chamber; and
   generate a performance index of the electrical device based on detecting a threshold degradation in performance of the electrical device subjected to the generated test soundscape.

17. The non-transitory computer readable medium of claim 16, wherein the soundscape within the computing enclosure is generated by a server cooling device.

18. The non-transitory computer readable medium of claim 16, wherein the determined acoustical contour of the soundscape within the computing enclosure housing the electrical device is based on a measurement by an acoustic transducer within the computing enclosure.

19. The non-transitory computer readable medium of claim 16, wherein the instructions when executed cause the system to:
   receive a measurement by a transducer in the test chamber, the transducer placed in a location of the test chamber based on a location of the electrical device in the computing enclosure,
   wherein the modifying of the generated test soundscape is based on the measurement by the transducer in the test chamber.

20. The non-transitory computer readable medium of claim 19, wherein modifying the generated test soundscape comprises gradually increasing a frequency of the generated test soundscape until the threshold degradation in performance of the electrical device is detected.

* * * * *